Aug. 5, 1958
G. CAWLEY
2,846,029
HYDRAULIC RETARDING DEVICE
Filed June 17, 1955
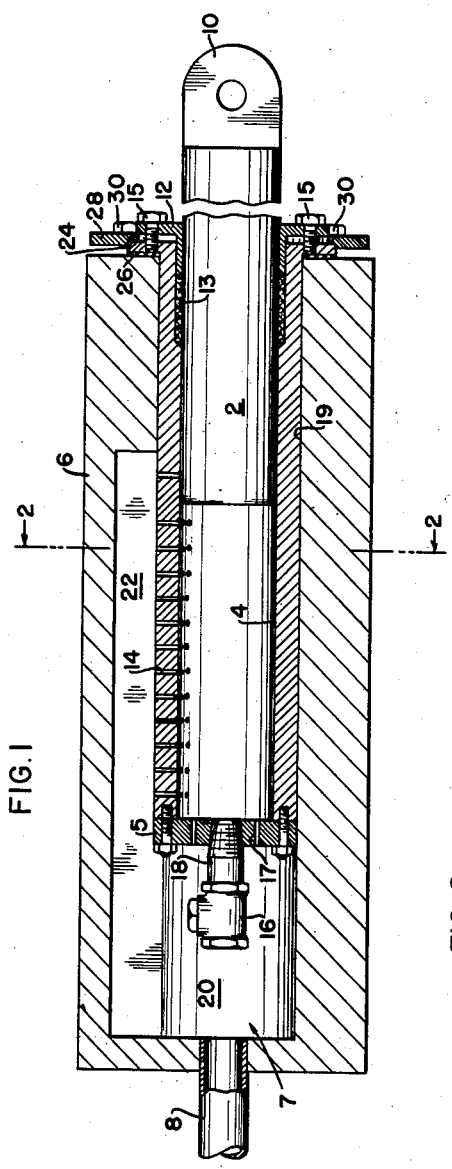
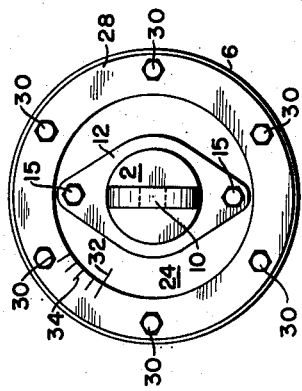
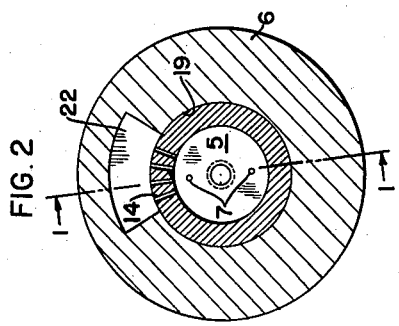
INVENTOR
GEORGE CAWLEY
BY
ATTORNEYS

United States Patent Office 2,846,029
Patented Aug. 5, 1958

2,846,029

HYDRAULIC RETARDING DEVICE

George Cawley, Upper Montclair, N. J.

Application June 17, 1955, Serial No. 516,103

2 Claims. (Cl. 188—94)

This invention relates to retarding devices and more particularly to hydraulically operating shock absorbers or buffers.

The invention provides a hydraulically operated buffer having an adjustable retarding force.

The invention will be described in terms of a preferred embodiment by reference to the accompanying drawings in which:

Fig. 1 is a longitudinal sectional view of a preferred embodiment;

Fig. 2 is a cross sectional view taken on the line 2—2 of Fig. 1; and

Fig. 3 is an end elevational view of the embodiment of Fig. 1.

The retarding device of the invention includes a piston 2 working within a cylinder 4, the cylinder being rotatably mounted within a hollow casing 6 whose cavity, generally indicated at 7, connects via a conduit 8 with a reservoir for hydraulic fluid, not shown. The cylinder is closed or substantially closed at one end, as by an end plate 5, toward which the piston is driven by the absorption of energy. The piston may be forced into the cylinder against the retarding effect of a hydraulic fluid therein, which is expelled from the cylinder through ports 14 to the cavity 7, from which it flows at low pressure through conduit 8 to the reservoir.

The buffer may be constructed in sizes to accept and absorb a large amount of energy in the course of a single stroke of its piston. The piston may be provided with a link 10 at its outer extremity for connection with mechanism whose energy of motion is to be absorbed. The casing 6 is customarily secured in fixed position by means not shown, but instead the piston may be made fixed and the casing made movable with respect to it. A gland 12 with a packing 13 tightened by a pair of studs 15 which engage the cylinder may be provided to prevent the escape of hydraulic fluid between the piston and cylinder.

Absorption of energy in the shock absorber of the invention takes place via the forcing of the hydraulic fluid out of the cylinder through a plurality of ports 14 which are provided in the side wall of the cylinder. These ports may be provided in a plurality of rows extending axially of the cylinder over the stroke of the piston so that the apertures are disposed in an array of generally rectangular area on the surface of the cylinder between elements of that surface. A check valve 16 connects between the cavity 7 and the interior of the cylinder at a conduit 18 passing through end wall 5 and is arranged to close against outward flow of fluid from the cylinder but to open when the pressure in cavity 7 is higher than in the cylinder in order to permit the cylinder to be rapidly refilled when the piston is withdrawn.

Additional ports 17 may be provided in the end wall 5 to relieve the pressure ahead of the piston after it covers all of the ports 14 in the said wall of the cylinder. With this construction the number of ports 14 available for the exit of fluid from the cylinder declines as the piston advances towards end wall 5. In this manner a better sustained retarding force may be provided for, with a lower initial value for a given total energy absorption per stroke, than in constructions in which all apertures are in the end wall 5 or are otherwise positioned to be effective throughout the stroke of the piston.

The casing is so constructed that its cavity includes a portion 20 ahead of the cylinder communicating with the inlet to the check valve 16. The portion 20 is advantageously formed as part of a cylindrical opening or bore 19 in the casing, dimensioned to fit the outer surface of the operating cylinder 4. Cylinder 4 is rotatable within this bore so that its angular position about its own axis can be varied with respect to the casing. The cavity 7 further includes a portion 22 of greater internal diameter than the bore 19 and which communicates with the portion 20.

The cavity portion 22 extends axially and circumferentially of the cylinder 4 over an area of the exterior surface of the cylinder equal to the area of the array of ports 14, as indicated in Figs. 1 and 2. The internal cylindrical wall 19 of the casing is thus relieved over a portion of its length and over a minor fraction of its circumference to permit the hydraulic fluid to be expelled through the ports 14 for flow to the cavity 20 and thence out of the casing. The cavity 22 formed by this relief may advantageously have a sectoral cross section as indicated in Fig. 2. By relative rotation of the cylinder and casing the ports 14 may be progressively closed off or obturated from the cavity 22, and hence the escape of the fluid from the cylinder therethrough may be prevented. The number of effective ports may then be varied by adjustment of the relative angular position of the cylinder and casing about the axis of the bore 19, and in this manner the retarding force presented by the piston may be adjusted.

As indicated in Figs. 1 and 3, the cylinder has affixed thereto or formed thereon an external flange 24 overlying the end face of the casing. A packing 26 may be provided between the flange 24 and the casing to provide a seal against the hydraulic fluid. In the construction shown the flange 24 transmits to the casing the thrust of the piston. Obviously however other means may be provided to prevent relative motion of the cylinder and casing in axial directions. A clamping ring 28 is constructed to overlie the flange 24, and a plurality of studs 30 are arranged to pass through the ring 28 and to engage threaded holes in the face of the casing in order that the cylinder may be clamped with respect to the casing in a plurality of angular positions about the axis of the cylinder. The flange 24, forming the end face of the cylinder as seen in Fig. 3, may be provided with an index mark 32 whose position with respect to graduations 34 on the ring 28 indicates the orientation of the cylinder within the casing.

With the cylinder rotated to the position indicated in Fig. 2 all of the apertures 14 are open to the sectoral space 22 so that the retarding force presented by the piston to a stress exerted on it has minimum value. The retarding force may be increased by loosening the studs 30 and rotating the cylinder until one or more rows of the apertures 14 are closed off at the inner cylindrical surface of the casing.

The invention has been described herein in terms of a preferred embodiment. Various modifications may however be made in the construction which has been illustrated and described without departing from the scope of the invention, which is set forth in the appended claims. For example it is not necessary that the ports or apertures in the cylinder be arranged in rows along elements of the exterior cylindrical surface of the operating cylinder, nor that they lie in a rectangular array. Neither is it necessary that the internal surface of the casing be relieved over a rectangular cylindrical surface; it is sufficient that the array of ports and the relieved portion of the internal surface of the casing be so shaped as to permit gradual obturation of the ports upon rotation of the cylinder with respect to the casing.

I claim:

1. An energy absorbing device comprising a cylinder, means to substantially close one end of the cylinder, said cylinder having a plurality of apertures in the side wall thereof disposed over a generally rectangular surface of said side wall, said cylinder further having at least one aperture in said closing means, a check valve arranged to permit the flow of fluid into said cylinder through said closing means, a piston fitting within said cylinder, and a casing surrounding said cylinder, said casing having a cavity therein accommodating said cylinder, the walls of said cavity engaging the exterior surface of said cylinder over substantially the entire length thereof and over a major fraction of its circumference, said cavity further including a portion relieved from contact with the exterior surface of said cylinder over an area substantially equal to the area of said rectangular surface and extending to and beyond said one end of said cylinder, said cylinder and casing being relatively rotatable about the axis of said cylinder.

2. An energy absorbing device comprising a casing having a cylindrical bore therein, said bore being relieved over a portion of its length and over a fraction of its circumference to a greater internal diameter to form a cavity within said casing exterior to said cylindrical bore and communicating therewith, a cylinder of lesser length than said bore rotatably fitting within said bore, said cylinder being substantially closed at one end and having a plurality of apertures through the side wall thereof and through said one end thereof, means restraining said casing and cylinder against relative motion axially of said bore with said one end intermediate the ends of said cavity, the apertures in said side wall being disposed within an area equal to the area of said cylinder exposed to said cavity, a piston fitting within said cylinder, said piston having a length substantially equal to the length of said area parallel to the axis of said cylinder, a check valve arranged to permit the flow of fluid through said one end into said cylinder between said one end and said piston, and fluid conduit means coupling said cavity to a reservoir.

References Cited in the file of this patent

UNITED STATES PATENTS

| | | |
|---|---|---|
| Re. 17,409 | Pennington | Aug. 20, 1929 |
| 889,619 | Kilgore | June 2, 1908 |
| 1,494,135 | Robinson et al. | May 13, 1924 |
| 1,621,653 | Bingaman | Mar. 22, 1927 |
| 1,870,827 | Arnold | Aug. 9, 1932 |
| 2,774,448 | Hultin | Dec. 18, 1956 |